(12) United States Patent
Naito (10) Patent No.: US 10,376,835 B2
(45) Date of Patent: Aug. 13, 2019

(54) DEVICE FOR REMOVING IMPURITIES FROM WATER-CONTAINING GAS AND IMPURITIES REMOVAL SYSTEM

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 756 days.

(21) Appl. No.: 14/941,774

(22) Filed: Nov. 16, 2015

(65) Prior Publication Data

US 2016/0067651 A1   Mar. 10, 2016

Related U.S. Application Data

(63) Continuation of application No. PCT/JP2014/064068, filed on May 28, 2014.

(30) Foreign Application Priority Data

Jun. 10, 2013 (JP) ................. 2013-121487

(51) Int. Cl.
*B01D 53/79* (2006.01)
*B01D 53/00* (2006.01)
(Continued)

(52) U.S. Cl.
CPC ........... *B01D 53/79* (2013.01); *B01D 5/0009* (2013.01); *B01D 53/002* (2013.01);
(Continued)

(58) Field of Classification Search
CPC ............... B01D 53/002; B01D 53/504; B01D 2251/304; B01D 2251/404; B01D 2256/22; B01D 2257/2045; B01D 2257/302; B01D 2257/404; B01D 2257/602; B01D 2258/0283; B01D 5/0009; B01D 53/60; B01D 53/68; B01D 53/79; B01D 2251/40
See application file for complete search history.

(56) References Cited

U.S. PATENT DOCUMENTS

2007/0122328 A1   5/2007  Allam et al.
2010/0294131 A1* 11/2010  Bade ............... B01D 53/50
                                            95/223
(Continued)

FOREIGN PATENT DOCUMENTS

JP    48-85481   11/1973
JP    6-126127   5/1994
(Continued)

OTHER PUBLICATIONS

English Translation of the International Search Report dated Sep. 2, 2014 in PCT/JP2014/064068 filed on May 28, 2014.

*Primary Examiner* — Shogo Sasaki
(74) *Attorney, Agent, or Firm* — Oblon, McClelland, Maier & Neustadt, L.L.P.

(57) ABSTRACT

Provided are a filler-integrated cooler having a cooler body with cooling space, gas inlet and outlet and communicated with bottom and top of the cooling space, a cooling pipe in the cooling space between the gas inlet and outlet to make cooling fluid from a cooling-fluid inlet go around in the cooling space and discharge the same through a cooling-fluid outlet and a filler vertically partitioning the cooling space into portions with the gas inlet and outlet, a nozzle arranged above in the cooling space, a drain circulator supplying drain in a drain reservoir at inner bottom of the cooling space through a drain outlet to the nozzles, using a pump, and an alkaline-agent addition unit to add an alkaline agent to drain.

7 Claims, 4 Drawing Sheets

(51) Int. Cl.
*B01D 53/50* (2006.01)
*B01D 5/00* (2006.01)
*B01D 53/60* (2006.01)
*B01D 53/68* (2006.01)

(52) U.S. Cl.
CPC .......... *B01D 53/504* (2013.01); *B01D 53/60* (2013.01); *B01D 53/68* (2013.01); *B01D 2251/304* (2013.01); *B01D 2251/40* (2013.01); *B01D 2251/404* (2013.01); *B01D 2256/22* (2013.01); *B01D 2257/2045* (2013.01); *B01D 2257/302* (2013.01); *B01D 2257/404* (2013.01); *B01D 2257/602* (2013.01); *B01D 2258/0283* (2013.01)

(56) References Cited

U.S. PATENT DOCUMENTS

2013/0319040 A1 12/2013 Naito
2013/0336867 A1 12/2013 Hodotsuka et al.

FOREIGN PATENT DOCUMENTS

| JP | 7-328380 | 12/1995 |
|----|----------|---------|
| JP | 11-197449 | 7/1999 |
| JP | 2000-15051 | 1/2000 |
| JP | 2001-129355 | 5/2001 |
| JP | 2006-263676 | 10/2006 |
| JP | 2007-145709 | 6/2007 |
| JP | 2012-143699 | 8/2012 |
| JP | 2014-4578 | 1/2014 |
| WO | WO 2012/107953 A1 | 8/2012 |

* cited by examiner

DEVICE FOR REMOVING IMPURITIES FROM WATER-CONTAINING GAS AND IMPURITIES REMOVAL SYSTEM

TECHNICAL FIELD

The present disclosure relates to a device and a system for removing impurities in water-containing gas.

BACKGROUND ART

Gas discharged from, for example, a combustor or a reaction device contains impurities to be removed. For example, an oxyfuel combustor has been reviewed as one of techniques for abating emission of carbon dioxide ($CO_2$) which is said to be one of factors for global warming, and attention has been attracted to a coal-fired boiler for oxyfuel combustion of pulverized coal. It has been conceived in the coal-fired boiler that oxygen in lieu of air is used as an oxidizing agent to produce exhaust gas mainly composed of carbon dioxide ($CO_2$) and the exhaust gas with high $CO_2$ concentration is compressed and cooled into liquefied carbon dioxide which is then transported by a vessel, a vehicle or other carrier means to a destination for storage thereof in the ground or alternatively the liquefied carbon dioxide increased in pressure is transported through a pipeline to a destination for storage thereof in the ground.

Such exhaust gas from the coal-fired boiler for oxyfuel combustion contains, in addition to carbon dioxide ($CO_2$), impurities derived from coal feedstock such as nitrogen oxides ($NO_x$), sulfur oxides ($SO_x$), mercury (Hg), hydrogen chloride (HCl) and dust. Such impurities require to be removed since the impurities may cause environmental contamination, corrosion and the like and admixture of the impurities may lower a purity degree of carbon dioxide ($CO_2$) discharged.

Among the above-mentioned impurities, sulfur oxides ($SO_x$) may be contacted with and dissolved in water into sulfuric acid ($H_2SO_4$) and hydrogen chloride (HCl) may be dissolved in water into hydrochloric acid, so that such water-soluble sulfur oxides and hydrogen chloride as well as dust may be separated through contact with water by, for example, water spraying.

Among the nitrogen oxides ($NO_x$) as the above-mentioned impurities, nitrogen dioxide ($NO_2$) may be contacted with and dissolved in water into nitric acid ($HNO_3$) to become separated. However, the exhaust gas from the coal-fired boiler has less oxygen ($O_2$) so that nitrogen ($N_2$) exists substantially in the form of nitrogen monoxide (NO) which is water-insoluble and thus is unremovable by, for example, water spraying.

Among the above-mentioned sulfuric, hydrochloric and nitric acids, especially sulfuric acid is known to corrode instruments in an exhaust gas treatment device; mercury, which is trace metal, is known to hurt low-temperature aluminum members constituting a heat exchanger. Thus, it is preferable to remove these impurities at early stages. There is also a problem that admixture of the impurities into the exhaust gas lowers a purity degree of the carbon dioxide, which makes troublesome the liquefaction of the carbon dioxide through compression and cooling and thus requires large-sized equipment therefor. Thus, in a coal-fired boiler for oxyfuel combustion or other system where produced is exhaust gas mainly composed of carbon dioxide which in turn is to be disposed, it is extremely important to remove the impurities in the exhaust gas.

Thus, it has been conducted, for example, in the coal-fired boiler for oxyfuel combustion that a spray-column-type, packed-column-type or other so-called wet desulfurizer used in a conventional air-fired boiler or the like is provided to remove sulfur oxides which are especially problematic in corrosivity. Moreover, nitrogen and nitrogen oxides derived from coal feedstock are produced in the exhaust gas from coal-fired boiler for oxyfuel combustion or the like, so that it has been conducted that a catalyst-type or other denitrator is arranged upstream of the desulfurizer to remove nitrogen and nitrogen oxides.

It is known that the provision of the wet desulfurizer as mentioned in the above removes sulfur oxides, hydrogen chloride and dust as well as part of nitrogen oxides and slightly removes mercury, which is inherently low in content. It has been also conceived that if mercury in the exhaust gas is still high in concentration even after the above-mentioned exhaust gas treatment is conducted, a mercury-removing column is arranged to remove the mercury by adsorbent or the like.

An exhaust gas treatment system comprises, for example, a duct with a dust collector and a wet desulfurizer for guidance of exhaust gas from a boiler which in turn burns fuel with combustion gas in the form of a mixture of oxygen-rich gas with circulation exhaust gas, an exhaust gas recirculation duct for guidance of part of the exhaust gas downstream of the dust collector to the boiler and $CO_2$ separation means for compression of the exhaust gas downstream of the desulfurizer to separate carbon dioxide, water separated during the compression of the exhaust gas by the $CO_2$ separation means being supplied to absorbing liquid used circulatorily in the desulfurizer (see Patent Literature 1).

Patent Literature 2 discloses an exhaust gas treatment system for an oxyfuel combustor with a front impurity removal device and at least one rear impurity removal device. The front impurity removal device comprises a compressor for compression of exhaust gas from the oxyfuel combustor to make water-soluble the impurities in the exhaust gas and a cooler for cooling of the exhaust gas compressed by the compressor to condense water and discharge drain with the impurities dissolved. The or each rear impurity removal device comprises a rear compressor for compression of the exhaust gas at a pressure higher than that in the compressor and a rear cooler and serves for discharging drain.

Patent Literature 3 discloses a carbon dioxide purification device comprising a compressor for elevation in pressure of gaseous carbon dioxide; at least one countercurrent gas/liquid contact device for washing of the gaseous carbon dioxide with water at elevated pressure in the presence of molecular oxygen and, when $SO_2$ is to be removed, $NO_x$ for a sufficient time to convert $SO_2$ to sulfuric acid and/or $NO_x$ to nitric acid; conduit means for feeding of the gaseous carbon dioxide at elevated pressure from the compressor to the or each gas/liquid contact device; and conduit means for recycling of aqueous sulfuric acid solution and/or aqueous nitric acid solution to the or each gas/liquid contact device.

Patent Literature 4 discloses a device for simultaneous treatment of dust collection and desulfurization wherein ash-containing boiler exhaust gas is cooled to or less than 40° C. to condense water in the exhaust gas, using boiler feeding water or boiler combustion air, exhaust gas at an outlet of a desulfurizing absorbing column or one or more kinds of seawater; $SO_x$ in the exhaust gas is removed, using desulfurizing absorption liquid which is a slurry of ash and condensed water admixed with lime; and unrequisite ash is separated by an unrequisite ash sedimentation/separation device below an absorption column tank.

Patent Literature 5 discloses a combustion exhaust gas purification system comprising a first process for making gas/liquid countercurrent contact of combustion exhaust gas with an aqueous alkali metal carbonate solution containing at least 0.1 N of alkali metal carbonate, using a leaking tray column, to reduce sulfur oxides and nitrogen oxides in the combustion exhaust gas; a second process for making gas/liquid countercurrent contact of the combustion exhaust gas from the first process containing carbon-rich gas and nitrogen with an aqueous alkali metal hydroxide solution, using a leaking tray column, to convert at least part of the carbon-rich gas in the exhaust gas into alkali metal carbonate to thereby purify the carbon-rich gas; and a regeneration process of the aqueous alkali metal hydroxide solution for reacting the alkali metal carbonate produced as a by-product in the second process with alkaline earth metal hydroxide to produce and separate alkaline earth metal carbonate to thereby withdraw the aqueous alkali metal hydroxide solution.

CITATION LIST

Patent Literature

Patent Literature 1: JP 2012-143699A
Patent Literature 2: WO2012/107953A
Patent Literature 3: JP 2007-145709A
Patent Literature 4: JPH 06-126127A
Patent Literature 5: JP 2006-263676A

SUMMARY

Technical Problems

However, in the conventional exhaust gas treatment system as disclosed in Patent Literature 1, the spray-column-type or other wet desulfurizer is provided to remove impurities and especially sulfur oxides ($SO_x$) in exhaust gas, so that disadvantageously the device for removal of impurities becomes extremely large in size and complicated in structure, leading to increase in installation cost.

Thus, a technique has been desired which can remove impurities such as sulfuric oxides in exhaust gas to be guided to a compressor, at low cost, using a simple device.

The disclosure was made in view of the above conventional problems and has its object to provide a device and a system for removing impurities in water-containing gas capable of removing impurities in water-containing gas at high efficiency, using a small-sized device.

Solution to Problems

The disclosure is directed to an impurity removal device for water-containing gas comprising a filler-integrated cooler having a cooler body with a cooling space, a gas inlet in communication with an inner underside of the cooling space, a gas outlet in communication with an inner upside of the cooling space, a cooling pipe arranged in the cooling space between the gas inlet and outlet for making cooling fluid go around from a cooling fluid inlet through the cooling space to discharge the cooling fluid through a cooling fluid outlet and a filler arranged in the cooling space to partition the cooling space vertically into portions with the gas inlet and outlet, respectively;

nozzles arranged in the inner upside of the cooling space; a drain circulator for pumping drain through a drain outlet arranged at a drain reservoir in an inner bottom of the cooling space to the nozzles for injection of the drain; and an alkaline agent addition unit for adding an alkaline agent to the drain.

It is preferable that the impurity removal device for the water-containing gas further comprises a pH sensor for detecting a pH of the drain in the drain reservoir and an alkaline agent controller for controlling a supply of the alkaline agent by the alkaline agent addition unit so as to keep a pH value detected by the pH sensor to a set value.

It is preferable that the impurity removal device for the water-containing gas further comprises a level gauge for detecting a level of the drain in the drain reservoir and a level controller for controlling a control valve at the drain outlet so as to keep a level value detected by the level gauge to a set value.

It is preferable in the impurity removal device for the water-containing gas that the gas inlet is connected to a compressor.

It is preferable that the impurity removal device for the water-containing gas further comprises a freezer arranged between the cooling fluid outlet and inlet.

The disclosure is directed to an impurity removal system for water-containing gas comprising, downstream of an impurity removal mechanism for removing impurities in gas from an oxyfuel combustor comprising a plurality of impurity separators with a plurality of compressors and aftercoolers for cooling the gas compressed by the compressors to discharge condensed drain, respectively, a filler-integrated cooler comprising a cooler body with a cooling space, a gas inlet in communication with an inner downside of the cooling space, a gas outlet in communication with an inner upside of the cooling space, a cooling pipe arranged in the cooling space between the gas inlet and outlet for making cooling fluid go around from a cooling fluid inlet through the cooling space to discharge the cooling fluid through a cooling fluid outlet and a filler arranged in the cooling space to partition the cooling space vertically into portions with the gas inlet and outlet, respectively;

nozzles arranged in the inner upside of the cooling space; a drain circulator for pumping drain through a drain outlet arranged at a drain reservoir in an inner bottom of the cooling space to the nozzles for injection of the drain; a freezer arranged between the cooling fluid outlet and inlet; and an alkalinity-control-agent supply flow passage for supply of the drain in the drain reservoir in the cooler body, as an alkalinity control agent, to at least an upstream side of the aftercooler in a first one of the impurity separators.

Advantageous Effects

An impurity removal device and a system for water-containing gas according to the disclosure can exhibit an excellent effect that impurities in water-containing gas can be removed at high efficiency, using a small-sized device.

BRIEF DESCRIPTION OF DRAWINGS

FIG. 2b is a schematic view showing a further modification of the filler-integrated cooler shown in FIG. 2a;

DESCRIPTION OF EMBODIMENTS

Embodiments of the disclosure will be described in conjunction with the attached drawings.

Figure 1:
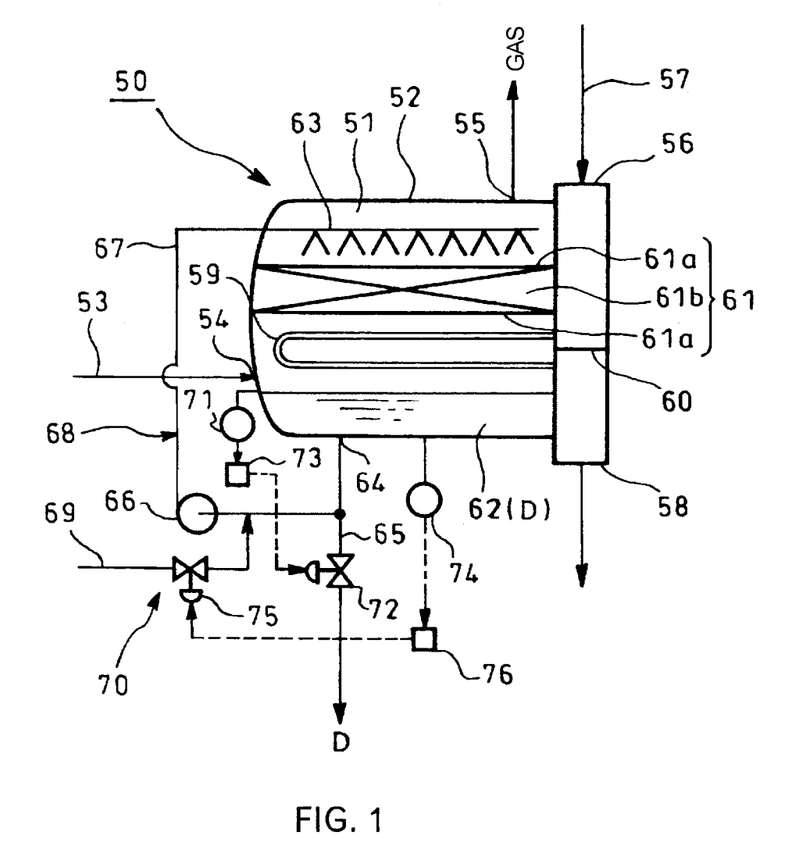
FIG. 1 is a schematic view showing an embodiment of a device for removing impurities in water-containing gas according to the disclosure.

FIG. 1 is a schematic view showing an embodiment of a device for removing impurities in water-containing gas according to the disclosure in which reference numeral 50 denotes a filler-integrated cooler. The filler-integrated cooler 50 comprises a cooler body 52 with a cooling space 51, a gas inlet 54 in communication with an inner underside of the cooling space 51 to introduce water-containing gas 53, a gas outlet 55 in communication with an inner upside of the cooling space 51, and a cooling pipe 59 arranged in the cooling space 51 between the gas inlet and outlet 54 and 55 to make cooling fluid 57 such as sea water or other cooling water introduced through a cooling fluid inlet 56 go around through the cooling space 51 to discharge the same through a cooling fluid outlet 58. Reference numeral 60 designates a partition plate which provides a partition between the cooling fluid inlet and outlet 56 and 58. Further, arranged in the cooling space 51 between the gas inlet and outlet 54 and 55 is a filler 61 vertically partitioning the cooling space 51. The filler 61 comprises, for example, upper and lower pored plates 61a with particles 61b (Raschig rings) filled therebetween.

Arranged in an inner bottom of the cooling space 51 is a drain reservoir 62, and arranged in the inner upside of the cooling space 51 are nozzles 63. A drain circulator 68 is arranged to supply drain D from a discharge pipe 65 connected to the drain outlet 64 of the drain reservoir 62 through a pump 66 and a circulation flow passage 67 to the nozzles 63 for injection therethrough.

FIG. 1 embodiment shows a case where the filler 61 is arranged above the cooling pipe 59 and the nozzles 63 is arranged above the filler 61. The circulation flow passage 67 is provided with an alkaline agent addition unit 70 for addition of the alkaline agent 69 to the drain D flowing through the circulation flow passage 67. Usable as the alkaline agent 69 is, for example, sodium hydroxide (NaOH), ammonia (—$NH_3$), magnesium hydrate (Mg(OH)$_2$) or a large amount of water ($H_2O$) (generally water is weak alkali).

The cooler body 52 is provided with a level gauge 71 for detection of a level of the drain D in the drain reservoir 62 and a level controller 73 for control of a control valve 72 in the discharge pipe 65 so as to keep a level value detected by the level gauge 71 to a set value.

The cooler body 52 is further provided with a pH sensor 74 for detection of a pH of the drain D in the drain reservoir 62 and an alkaline agent controller 76 for control of a supply valve 75 in the alkaline agent addition unit 70 to control a supply of the alkaline agent 69 so as to keep a pH value detected by the pH sensor 74 to a set value.

Figure 2A:
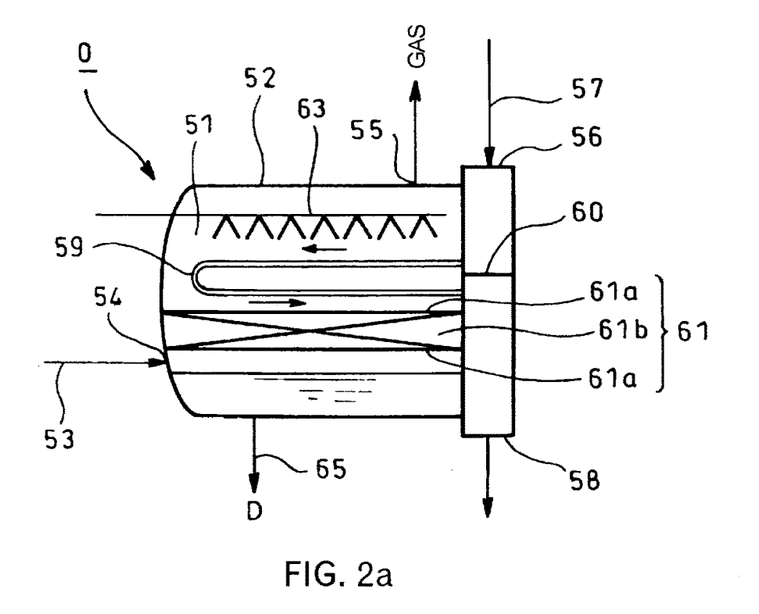
FIG. 2a is a schematic view showing a modification of a filler-integrated cooler shown in FIG. 1.
Figure 2B:
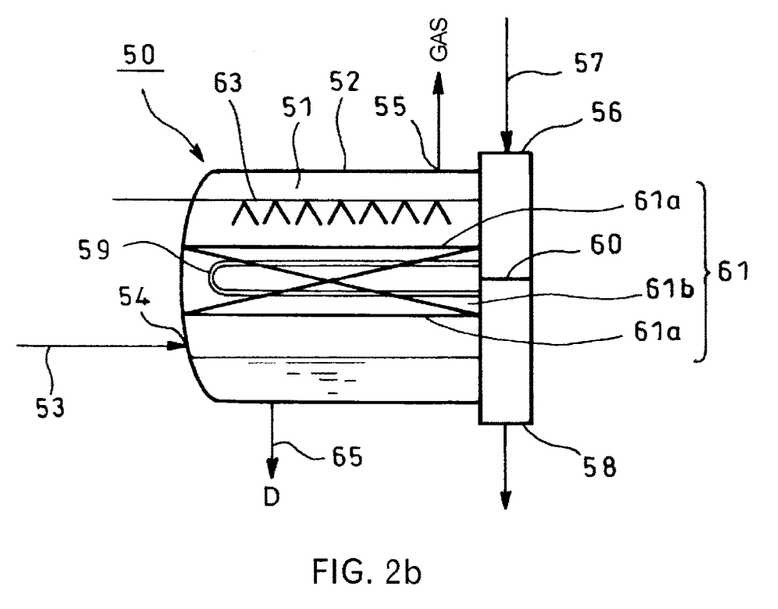

FIGS. 2a and 2b show modifications of FIG. 1 embodiment. FIG. 2a shows a case where the cooling pipe 59 is arranged above the filler 61, and the nozzles 63 is arranged above the cooling pipe 59, and FIG. 2b shows a case where the cooling pipe 59 is arranged within the filler 61.

Mode of operation of the embodiment shown in FIGS. 1 and 2 will be described.

The cooling pipe 59 in the filler-integrated cooler 50 constituting the impurity removal device for the water-containing gas is supplied with the cooling fluid 57 such as sea water or cooling water to thereby cool the cooling space 51, and the drain D in the drain reservoir 62 at the inner bottom of the cooling space 51 is supplied by the drain circulator 68 to the nozzles 63 at the upside of the cooling space 51 for injection.

In this case, the level controller 73 makes control to keep the level of the drain D in the drain reservoir 62 detected by the level gauge 71 to the constant value, so that the drain D in the drain reservoir 62 can be reliably circulated by the drain circulator 68 for injection.

Then, the water-containing gas 53 from different combustors, reaction devices or the like and containing water and impurities is introduced into the cooling space 51 through the gas inlet 54 of the cooling body 52 in the filler-integrated cooler 50 constituting the impurity removal device for water-containing gas. The water-containing gas 53 introduced into the cooling space 51 is cooled through heat exchange with the cooling pipe 59 to make the contained water condensed into drain which drops down to the drain reservoir 62. The impurities in the gas free from the water are removed when the gas passes through the filler 61. In this case, the drain D has been injected to the filler 61 through the nozzles 63 of the drain circulator 68 and has been added with the alkaline agent 69 from the alkaline agent addition unit 70, so that the gas passing through the filler 61 is contacted with the drain D to effectively remove the impurities.

Since the pH sensor 74 is provided to detect the pH of the drain D in the drain reservoir 62 and the alkaline agent controller 76 is provided to control the supply valve 75 in the alkaline agent addition unit 70 for control of the supply of the alkaline agent 69 so as to keep the pH value detected by the pH sensor 74 to the set value, the control to keep high the pH value of the drain D injected by the nozzles 63 enhances dissolution of the impurities in the drain D to further enhance impurity removal performance. As mentioned in the above, clean gas free from the impurities is discharged through the gas outlet 55.

Figure 3:
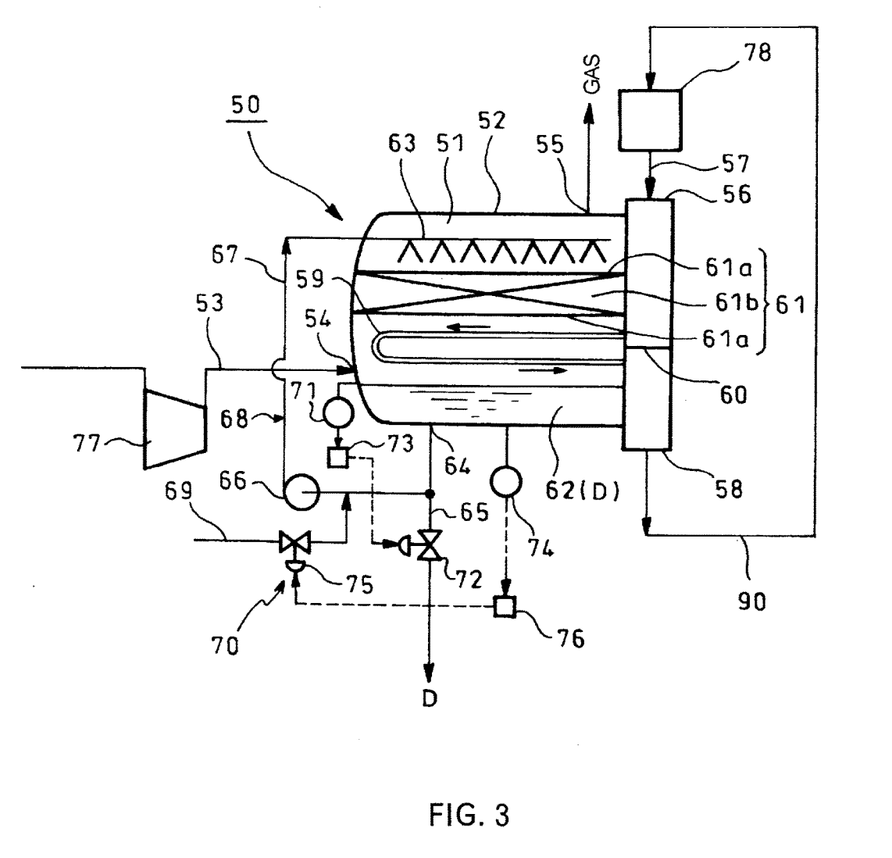
FIG. 3 is a schematic view showing a further embodiment of the device for removing impurities in water-containing gas according to the disclosure.

FIG. 3 shows a further embodiment of the device for removing impurities in water-containing gas according to the disclosure. This embodiment is a case where the gas inlet 54 is provided with a compressor 77 for compression of the water-containing gas 53. The cooling fluid outlet 58 is connected to the cooling fluid inlet 56 through a circulation flow passage 90 provided with a freezer 78.

As shown in FIG. 3, the water-containing gas 53, which has been compressed by the compressor 77, is introduced into the cooling space 51 in the cooler body 52 so that drain D is separated more from the compressed water-containing gas 53 than that in the previous embodiment, and the impurities in the gas is effectively removed through contact with the low-temperature drain D. In this case, the impurities in the pressurized gas is accelerated in oxidization so that dissolution of the impurities in the drain D is further enhanced to perform effective removal.

By the provision of the freezer 78, the cooling fluid (cooling medium) lowered in temperature by the freezer 78 is supplied to the cooling pipe 59 to further cool the water-containing gas 53, so that still more drain D is separated from the water-containing gas 53 and the dissolution of the impurities in the gas to the drain D is further enhanced due to lowness in temperature to perform effective removal.

Figure 4:
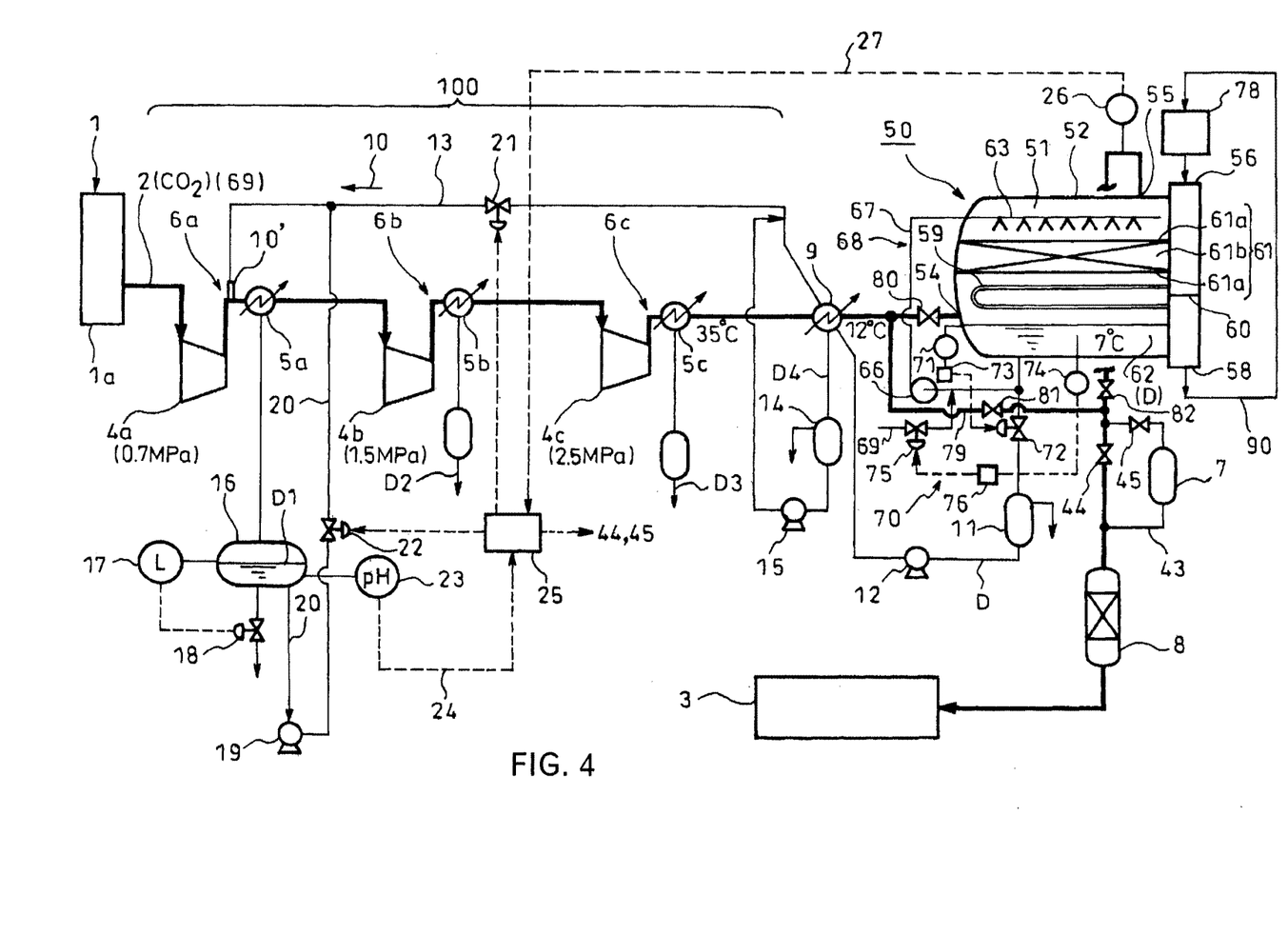
FIG. 4 is a schematic view showing a system for removing impurities in water-containing gas in which a filler-integrated cooler according to the disclosure is applied downstream of an impurity removal mechanism for removal of impurities in gas from an oxyfuel combustor.

FIG. 4 is a schematic view showing an embodiment of a impurity removal system for water-containing gas in which a filler-integrated cooler according to the disclosure is applied downstream of an impurity removal mechanism 100 for removing impurities in the gas from the oxyfuel combustor.

In FIG. 4, reference numeral 1 denotes an oxyfuel combustor comprising, for example, a coal-fired boiler 1a for oxyfuel combustion of pulverized coal. Discharged from the oxyfuel combustor 1 is exhaust gas 2 (water-containing gas 53) mainly composed of carbon dioxide ($CO_2$). For supply and liquefaction of such exhaust gas 2 from the oxyfuel combustor 1 to and in a carbon dioxide liquefier 3, arranged upstream of the carbon dioxide liquefier 3 is an impurity removal mechanism 100 which compresses the exhaust gas 2 up to a target pressure, i.e., a pressure required for the liquefaction in the carbon dioxide liquefier 3 or a predetermined pressure approximate to the required pressure, to remove the impurities in the exhaust gas 2.

The impurity removal mechanism 100 comprises a plurality of (three in the embodiment illustrated) impurity separators 6a, 6b and 6c comprising a plurality of compressors 4a, 4b and 4c for compression of the exhaust gas 2 from the oxyfuel combustor 1 stepwisely up to the target pressure and aftercoolers 5a, 5b and 5c (coolers) for downstream cooling of the exhaust gas 2 compressed in the respective compressors 4a, 4b and 4c to discharge water condensed by the cooling as drains. A cooler arranged between compressors is generally called as intercooler; however, for ease of explanation, all of the coolers in the disclosure are explained as aftercoolers 5a, 5b and 5c.

Operations of the impurity separators 6a, 6b and 6c for liquefaction of carbon dioxide under various temperature and pressure conditions were studied to find out that it is preferable in FIG. 4 embodiment to increase a pressure of the exhaust gas 2 up to 2.5 MPa prior to supply of the carbon dioxide 2 to the carbon dioxide liquefier 3. Thus, 2.5 MPa is set as the target pressure. The target pressure may be set at will.

It is not efficient to pressurize the exhaust gas 2 up to the target pressure of 2.5 MPa all at once by a single compressor 4. Thus, in the embodiment, the three compressors 4a, 4b and 4c are arranged for three-step compressions into 0.75 MPa, 1.5 MPa and 2.5 MPa, thus providing the impurity separators 6a, 6b and 6c. The number of the compressors 4a, 4b and 4c (the number of the impurity separators 6a, 6b and 6c) may be any including 4 or more.

By the impurity removal mechanism 100, the impurities in the exhaust gas 2 can be effectively removed. When a concentration of mercury (Hg) in the carbon dioxide having passed through the impurity removal mechanism 100 is higher than its target value, a mercury-removing column 7 may be arranged downstream of the impurity removal mechanism 100 to remove mercury, using an adsorbent or the like.

Arranged upstream of the carbon dioxide liquefier 3 (and downstream of the mercury-removing column 7) is a dryer 8 for removal of water in the carbon dioxide to be supplied to the carbon dioxide liquefier 3.

In the first impurity separator 6a of the impurity removal mechanism 100, almost all of the water in the exhaust gas 2 is discharged as drain D1; in the middle impurity separator 6b, drain D2 is discharged which is smaller in quantity than the drain D1; and in the last impurity separator 6c, drain D3 is discharged which is smaller than the drain D2. The drains D1, D2 and D3 separated by the aftercoolers 5a, 5b and 5c and having impurities are usually supplied to a drainage treatment apparatus (not shown) for disposal.

In the aftercoolers 5a, 5b and 5c, the exhaust gas 2 is cooled, usually using sea water. Thus, the exhaust gas 2 discharged from the last aftercooler 5c in FIG. 4 embodiment usually has a temperature of around 35° C.

The inventor found it preferable to cool the exhaust gas to be guided to a dryer 8 arranged downstream of the impurity removal mechanism 100 to a temperature of around 7° C. for effective drying of the exhaust gas by the dryer 8. Lowering in temperature of the exhaust gas to be guided to the dryer 8 lowers a saturated temperature of water in the dryer 8 so that dehumidification effect by the dryer 8 is enhanced, whereby the dryer 8 can be reduced in size.

To this end, in FIG. 4 embodiment, arranged downstream of the impurity removal mechanism 100 is a filler-integrated cooler 50 constructed as shown in FIG. 1, and a cooling fluid outlet 58 is connected to a cooling fluid inlet 56 through a circulation flow passage 90 which is provided with a freezer 78 for cooling of cooling space 51 to around 7° C.

Drain D is discharged also from the filler-integrated cooler 50 since the exhaust gas with the temperature of 35° C. from the impurity removal mechanism 100 is cooled down to 7° C. in the filler-integrated cooler 50.

The inventor conducted a test for measurement of a pH of the drain D from the filler-integrated cooler 50. As a result, it was found out that the pH of the drain D is continuously 11 or more and does not lower below 11, high pH being constantly indicative. It is conceived that, due to the high pressure of 2.5 MPa in the impurity removal mechanism 100, sodium and calcium in the water react with carbon dioxide ($CO_2$) in the exhaust gas to facilitate production of, for example, sodium bicarbonate ($CHNaO_3$) and calcium bicarbonate ($Ca(HCO_3)_2$) and the pH of 11 or more is kept due to the action of the high pressure.

Thus, it is found out in FIG. 4 embodiment that supplying the drain D of pH 11 or more from the filler-integrated cooler 50, as an alkalinity control agent 10, to an upstream side of the aftercooler 5a in the impurity removal mechanism 100 substantially enhances impurity removal performance of the impurity removal mechanism 100, so that the embodiment is constructed as follows. Since the drain D discharged from the filler-integrated cooler 50 has the pH of 11 or more, the alkaline agent addition unit 70 shown in FIG. 4 may be omitted.

A drain receiver 11 is arranged to receive the drain D produced in the filler-integrated cooler 50, and an alkalinity-control-agent supply flow passage 13 is arranged to supply the drain D (the alkalinity control agent 10) in the drain receiver 11 through a pump 12 to an upstream side of the aftercooler 5a in the first impurity separator 6a. The alkalinity control agent 10 is supplied through an alkalinity-control-agent supply flow passage 13 to a nozzle 10' arranged upstream of the aftercooler 5a in the first impurity separator 6a and is admixed into the exhaust gas 2 by the nozzle 10'. The nozzle 10' may be arranged at any position between the compressor 4a and the aftercooler 5a.

Further, arranged upstream of the filler-integrated cooler 50 is an auxiliary cooler 9 for cooling of the exhaust gas 2. The cooling of the exhaust gas 2 by the auxiliary cooler 9 produces drain D4 with a pH of 11 or more which is received by a drain receiver 14 and is joined by a pump 15 with the alkalinity control agent 10 downstream of the auxiliary cooler 9. The drain D from the filler-integrated cooler 50, which has a temperature as low as around 7° C., is guided as cooling medium through an alkalinity-control-agent supply flow passage 13 to the auxiliary cooler 9 to cool the exhaust gas 2. In the auxiliary cooler 9, due to the cooling energy of the drain D, the exhaust gas 2 with a temperature around 35° C. is effectively cooled to, for example, around 12° C. Thus, the provision of the auxiliary cooler 9 can reduce a load of the filler-integrated cooler 50 or reduce in size of the filler-integrated cooler 50.

Arranged for the aftercooler 5a in the first impurity separator 6a is a drain tank 16 which stores an amount of drain D1 from the aftercooler 5a. The drain tank 16 is provided with a level controller 17 which controls an opening degree of a discharge valve 18 which in turn is arranged on a drain outlet side (downstream) of the drain tank 16 so as to always keep a detected level to a constant value. The drain tank 16 is provided with a drain supply flow passage 20 through which part of the drain D1 in the drain tank 16 is discharged by a pump 19 into the alkalinity-control-agent supply flow passage 13.

The alkalinity-control-agent supply flow passage 13 has a supply valve 21; the drain supply flow passage 20 has a mixing valve 22; and the drain tank 16 has a pH sensor 23 for measurement of a pH in the drain D1. A pH value 24 detected by the pH sensor 23 is inputted to a controller 25 which in turn controls the supply and mixing valves 21 and 22 to control a pH concentration of the alkalinity control agent 10 supplied to the nozzle 10' so as to keep the detected pH value 24 to a predetermined set value of, for example, pH 5.

Arranged at a gas outlet 55 of the filler-integrated cooler 50 is an impurity sensor 26 for detection of impurities (for example, sulfur oxides and/or nitrogen oxides) in the exhaust gas 2, and an impurity value 27 of nitrogen oxides detected by the impurity sensor 26 is inputted to the controller 25. The controller 25 serves to control the supply and mixing valves 21 and 22 to urgently increase a supply of the alkalinity control agent 10 when the impurity value 27 of nitrogen oxides detected by the impurity sensor 26 exceeds a predetermined set value. The mercury-removing column 7 is provided with a bypass duct 43 as well as changeover valves 44 and 45 for changeover between flowing and non-flowing states of the exhaust gas 2 to the mercury-removing column 7; when the detected value of mercury by the impurity sensor 26 exceeds the predetermined value, the changeover valves 44 and 45 are changed over by a command from the controller 25 to cause the exhaust gas 2 passing through the mercury-removing column 7. When sufficient impurity removal effect is attained by the impurity removal mechanism 100 shown in FIG. 4, the exhaust gas 2 may be bypassed through a bypass line 79 to a downstream side of the filler-integrated cooler 50, without passing the same through the filler-integrated cooler 50. Reference numerals 80, 81 and 82 denote changeover valves for changeover between flowing and non-flowing states of the exhaust gas 2 to the filler-integrated cooler 50.

Next, mode of operation of FIG. 4 embodiment will be described.

In the impurity removal system for water-containing gas shown in FIG. 4, the exhaust gas 2 (water-containing gas 53) mainly constituted of carbon dioxide resulting from the oxyfuel combustion in the oxyfuel combustor 1 is guided with a pressure of, for example, 0.1 MPa (one atmosphere of pressure) to the compressor 4a in the first impurity separator 6a of the impurity removal mechanism 100, and is pressurized by the compressor 4a to 0.7 MPa. The exhaust gas 2 pressurized by the compressor 4a to 0.7 MPa is supplied to and cooled by the adjacent aftercooler 5a from which plenty of drain D1 is discharged owing to the cooling. In this case, effectively removed from the first aftercooler 5a are almost all of water-soluble impurities, i.e., sulfur oxides, hydrogen chloride and dust in the exhaust gas 2. Specifically, the water-soluble impurities, i.e., sulfur oxides and hydrogen chloride are removed in a high removal ratio together with the plenty of drain D1 discharged from the first aftercooler 5a.

The exhaust gas 2 cooled by the aftercooler 5a is guided to and pressurized by the compressor 4b in the downstream (succeeding) impurity separator 6b to 1.5 MPa. The exhaust gas 2 pressurize to 1.5 MPa is cooled by the adjacent aftercooler 5b from which drain D2 is discharged in an amount smaller than that from the aftercooler 5a. And, due to the pressure being elevated by the compressor 4b, part of sulfur oxides and hydrogen chloride are also removed in the succeeding aftercooler 5b together with the small amount of drain D2.

The exhaust gas 2 cooled by the aftercooler 5b is guided to and pressurized by the compressor 4c in the last impurity separator 6c to 2.5 MPa. The exhaust gas 2 compressed by the compressor 4c to 2.5 MPa is cooled by the adjacent aftercooler 5c and drain D3 is discharged from the aftercooler 5c in an amount still smaller than that in the aftercooler 5b.

The exhaust gas 2 is pressurized to 2.5 MPa in the compressor 4c of the last impurity separator 6c, so that nitrogen monoxide (NO) existing in the exhaust gas 2 is accelerated in oxidization by the pressurization into water-soluble nitrogen dioxide ($NO_2$). Thus, part of nitrogen dioxide ($NO_2$) is removed together with the drain D3 discharged from the aftercooler 5c.

Further, the exhaust gas 2 is introduced into and cooled by the filler-integrated cooler 50 arranged downstream of the impurity removal mechanism 100 to around 7° C. to thereby produce drain D which is injected by the drain circulator 68 through the nozzles 63, so that during fluidization of the exhaust gas 2 through the filler 61, nitrogen dioxide ($NO_2$) in the exhaust gas 2 is effectively removed by contact with the drain D. Thus, nitrogen oxides in the exhaust gas is removed at high removing ratio by the filler-integrated cooler 50.

In the above, the drain D produced in the filler-integrated cooler 50 and stored in the drain receiver 11 is supplied as the alkalinity control agent 10 by the pump 12 through the alkalinity-control-agent supply flow passage 13 to the auxiliary cooler 9 for cooling of the exhaust gas 2, and then is supplied by the nozzle 10' upstream of the aftercooler 5a in the first impurity separator 6a to the exhaust gas 2. Such supply of the alkalinity control agent 10 upstream of the aftercooler 5a for the exhaust gas 2 effectively performs removal of especially sulfur oxides, hydrogen chloride and the like in exhaust gas 2 by the impurity removal mechanism 100.

Further, the drain D1 from the first aftercooler 5a and stored in the drain tank 16 is supplied to the alkalinity-control-agent supply flow passage 13 through the drain supply flow passage 20 for mixing with the alkalinity control agent 10. By the supply of the drain D1 to the alkalinity control agent 10, the alkalinity control agent 10 diluted to a predetermined pH is supplied to the nozzle 10'.

Dissolution of plenty of sulfur oxides in the exhaust gas into the drain D1 would substantially lower the pH of the drain D1 (into, for example, around pH 1) and make the drain D1 into a saturated state, leading to substantial lowering in dissolution of the sulfur oxides in the drain D1 and thus lowering in removal effect of sulfur oxides. However, the controller 25 controls the supply and mixing valves 21 and 22 in the supply flow passages 13 and 20, respectively, so as to keep the detected pH value of the drain D1 discharged from the first aftercooler 5a to a set value, e.g., pH 5, so that the atmosphere of the aftercooler 5a is kept to high pH, and thus the impurities are removed with the drain D1 at high removal ratio.

The drains D4 and D with pH of 11 or more discharged as the alkalinity control agent 10 from the filler-integrated cooler 50 and auxiliary cooler 9, respectively, and supplied upstream of the aftercooler 5a can be ensured in a sufficient amount to keep the pH of the drain D1 to a set value of pH 5; and superfluous drains D4 and D are discharged from the drain receivers 11 and 14 into a drainage treatment apparatus (not shown) for disposal.

The detected impurity value 27 of sulfur oxides by the impurity sensor 26 arranged downstream of the aftercooler 5c in the last impurity separator 6c is inputted to the controller 25 which in turn performs the control to increase the supply of the alkalinity control agent 10 through the alkalinity-control-agent supply flow passage 13 when the detected impurity value 27 of sulfur oxides exceeds a predetermined set value, so that the impurities at the outlet of filler-integrated cooler 50 can be prevented from increasing.

The level controller 73 performs the control to keep constant the level of the drain D in the drain reservoir 62 detected by the level gauge 71, so that the drain D in the drain reservoir 62 can be reliably circulated by the drain circulator 68 for injection.

Provision of the alkaline agent controller 76 to keep a pH of the drain D in the drain reservoir 62 to a set value can keep constant the pH of the drain D and keep constant the impurity removal effect by the filler-integrated cooler 50.

As mentioned in the above, in the impurity removal system for water-containing gas with the filler-integrated cooler 50 downstream of the impurity removal mechanism 100 according to the disclosure, in addition to the impurity removal effect by the impurity removal mechanism 100, the impurity removal effect is exhibited by the filler-integrated cooler 50, so that reliable impurity removal can be attained. Further, by guiding the drain D produced in the filler-integrated cooler 50 as the alkalinity control agent 10 to the impurity removal mechanism 100, the impurity removal effect by the impurity removal mechanism 100 can be enhanced without supply of new alkaline agent.

It is to be understood that a device and a system for removing impurities in water-containing gas according to the disclosure is not limited to the above embodiments and that various changes and modifications may be made without departing from the scope of the disclosure.

REFERENCE SIGNS LIST 1 oxyfuel combustor
2 exhaust gas (water-containing gas)
4a, 4b and 4c compressor
5a, 5b and 5c aftercooler
6a, 6b and 6c impurity separator
13 alkalinity control agent supply flow passage
50 filler-integrated cooler
51 cooling space
52 cooler body
53 water-containing gas
54 gas inlet
55 gas outlet
56 cooling fluid inlet
57 cooling fluid
58 cooling fluid outlet
59 cooling pipe
61 filler
61a and 61a pored plate
61b particles
62 drain reservoir
63 nozzle
64 drain outlet
65 discharge pipe
66 pump
68 drain circulator
69 alkaline agent
70 alkaline agent addition unit
71 level gauge
72 control valve
73 level controller
74 pH sensor
76 alkaline agent controller
77 compressor
78 freezer
100 impurity removal mechanism

The invention claimed is:

1. An impurity removal device for water-containing gas connected to an impurity separator including a compressor to which gas is introduced from an oxyfuel combustor and an aftercooler for cooling the gas compressed by the compressor to discharge condensed drain, said impurity removal device comprising:
a cooler with a cooling space, and a drain reservoir in an inner bottom of said cooling space;
a filler arranged in said cooling space to vertically partition a space above said drain reservoir;
a gas inlet connected to said cooler to communicate with an inner underside of said cooling space defined by said filler for introduction of the water-containing gas for said aftercooler;
a gas outlet connected to said cooler to communicate with an inner upside of said cooling space defined by said filler;
a cooling pipe arranged in the inner underside of said cooling space defined by said filler and through which cooling fluid passes;
a cooling fluid inlet on a first end of said cooling pipe;
a cooling fluid outlet on a second end of said cooling pipe;
nozzles arranged in the inner upside of said cooling space defined by said filler;
a drain circulator with a drain outlet on a bottom of said cooler for discharge of drain from said drain reservoir, a circulation flow passage for communication of said drain outlet with said nozzles, and a pump arranged in said circulation flow passage, thereby injecting the drain through the nozzles; and
an alkaline agent addition unit with a flow passage communicated with said circulation flow passage for adding an alkaline agent to the drain.

2. The impurity removal device for water-containing gas as claimed in claim 1, further comprising:
a supply valve arranged in the flow passage of said alkaline agent addition unit;
a pH sensor for detecting a pH of drain in the drain reservoir; and
an alkaline agent controller for controlling an opening degree of said supply valve to control a supply of the alkaline agent by the alkaline agent addition unit so as to keep a pH value detected by the pH sensor to a set value.

3. The impurity removal device for water-containing gas as claimed in claim 1, further comprising:
- a level gauge for detecting a level of the drain in the drain reservoir; and
- a level controller for controlling a control valve at the drain outlet so as to keep a level value detected by the level gauge to a set value.

4. The impurity removal device for water-containing gas as claimed in claim 2, further comprising:
- a level gauge for detecting a level of the drain in the drain reservoir; and
- a level controller for controlling a control valve at the drain outlet so as to keep a level value detected by the level gauge to a set value.

5. The impurity removal device for water-containing gas as claimed in claim 1, further comprising:
- a cooling fluid circulation flow passage for connecting said cooling fluid outlet with said cooling fluid inlet; and
- a freezer arranged in said cooling fluid circulation flow passage.

6. The impurity removal device for water-containing gas as claimed in claim 1, further comprising a partition plate which provides a partition between the cooling fluid inlet and the cooling fluid outlet.

7. The impurity removal device for water-containing gas as claimed in claim 1, wherein the filler includes an upper pored plate, a lower pored plate, and particles filled between the upper pored plate and the lower pored plate.

* * * * *